Figure 1:
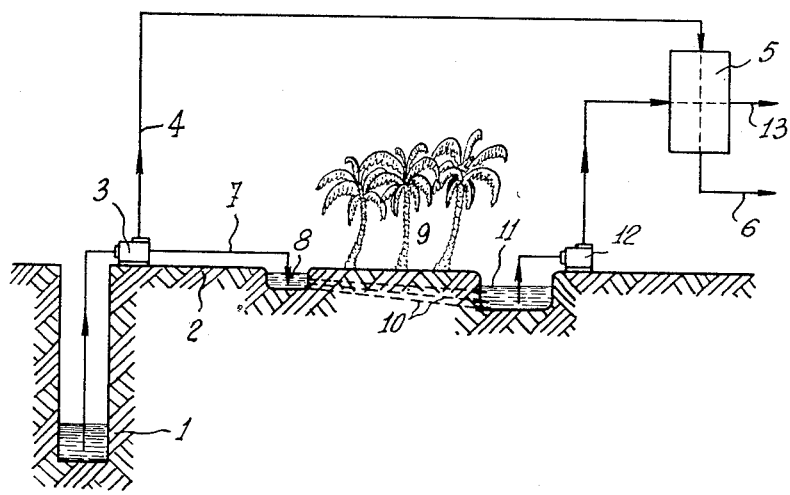

Jan. 30, 1962   C. GOMELLA   3,019,183
METHOD OF SOFTENING WATER BY ION EXCHANGE
Filed Sept. 19, 1958

United States Patent Office 3,019,183
Patented Jan. 30, 1962

3,019,183
METHOD OF SOFTENING WATER BY
ION EXCHANGE
Cyril Gomella, Alger, France, assignor to Societe
d'Etudes pour le Traitement et l'Utilisation des Eaux—
S.E.T.U.D.E., Alger, a French society
Filed Sept. 19, 1958, Ser. No. 762,141
Claims priority, application France Oct. 10, 1957
1 Claim. (Cl. 210—30)

This invention relates to water softening processes by ion exchange. In softening water and aqueous liquids by means of ion exchange agents, the spent ion exchanger has to be regenerated. For this purpose it is customary to use solutions containing alkali salts, such as sodium chloride. Suitable regenerating solutions may be produced by adding to natural water a soluble alkali salt such as sodium chloride; or where convenient solutions from natural sources may be used, such as sea water for example. In all cases however, the regenerating liquid used heretofore has differed in origin and nature from the water or liquid to be softened.

An object of the present invention lies in using, as the regenerator liquid, a liquid of similar nature to, and preferably from the same source as, the liquid to be softened, as the regenerator liquid after suitable treatment. Since it is necessary that the regenerator liquid contain alkali salts, e.g. dissolved sodium chloride, the water to be softened is treated according to the invention so that the ratio of sodium ions to the undesirable ions such as calcium ions which are the cause of the "hardness" to be removed, will be increased.

One especially advantageous practical application of the improved water softening process is to water softening plants installed in desert and semi-desert areas. In such areas the hard natural water prior to softening is used for irrigation purposes and is then drained. Owing to the intense natural evaporation, the concentration of the irrigation water rises rapidly as it flows over and through the irrigated soil, so that the concentration of inorganic substances in the drainage waters is very high. Since the carbonates and sulfates of calcium and magnesium are only poorly soluble, part of these constituents precipitate, increasing the relative amount of the more soluble sodium ions to the less soluble ions, especially the calcium ions, in solution. Hence, the resulting drainage water is highly suitable for use as the regenerator liquid according to the method of the invention, and can be said in a way to become a valuable by-product of the irrigation process.

Alternatively, a similar concentrating effect can be obtained for the purpose of the invention by evaporating natural waters containing sodium ions in addition to calcium and similar hard ions, by exposing the water to the action of the sun in suitable shallow ditches, ponds or lagoons.

Figure 2:
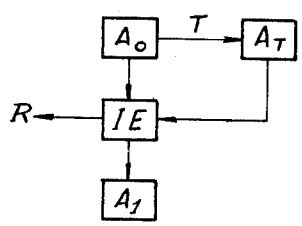
Figure 3:
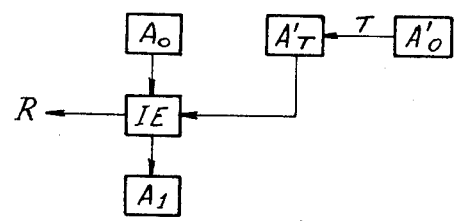

An exemplary installation embodying the method of the invention is illustrated in the accompanying drawings, wherein:

FIG. 1 is a partly pictorial, partly schematic, view of a softening plant installation according to a form of the invention, FIG. 2 is a flowsheet diagram of the process; and FIG. 3 is a modified flowsheet diagram.

Referring to FIG. 1, a water well 1 is shown bored into the ground 2. The water is pumped out of the well by a pumping unit 3 and discharged partly by way of a line 4 into the top of an ion exchange column 5. The effluent water from the bottom of the column at 6 is softened water, e.g. suitable for drinking purposes. Another part of the water from pump 3 flows by way of line 7 to an irrigation system 8 shown as serving to water a palmgrove 9.

As it flows through and over the soil at 10, the irrigation water becomes comparatively enriched in sodium ions owing to the greater precipitation therefrom of such constituents as calcium carbonate and calcium sulfates, as compared to sodium chloride. The irrigation water is collected in a network of drainage ditches such as 11, in which a further amount of evaporation will usually occur, and is then discharged by pump 12 into the ion exchanger in the column 5, thereby regenerating the ion exchanger agent progressively as it becomes exhausted. The spent regenerator liquid in turn is withdrawn at 13, and may be disposed of.

Various departures may be made with respect to the exemplary embodiment shown in FIG. 1 within the scope of the invention. Thus, the irrigating water and the water to be softened are not necessarily taken from the same well 1. Further, it is not necessary that the initial chemical composition be the same in the waters from both sources, provided the water serving for irrigation be of such composition that after evaporation, its sodium ion content is increased relatively to the content of calcium and similar ions, so that it can then be used to regenerate the spent ion exchange agent.

Thus, if the waters of a lagoon, lake, etc. are allowed to evaporate partly, the calcium compounds and magnesium compounds if any will settle out, while the sodic constituents remain wholly or partly in solution, so that the concentrated water can then serve to regenerate an ion-exchange agent in water softening apparatus.

FIG. 2 illustrates a basic flowsheet diagram of the process of the invention. An aqueous liquid $A_0$ containing sodium ions and calcium ions, and possible yet other ions such as magnesium, chlorine, bicarbonate, sulfate and the like, is passed through an ion exchanger apparatus 1E. The effluent water $A_1$ is softened, i.e. it contains no calcium ions or only a small proportion thereof. Another fraction of the liquid $A_0$ is, according to the invention, subjected to a treatment T for increasing the sodium ion concentration over the calcium ion concentration in it. The treated liquid $A_T$ is then used to regenerate the spent ion exchange agent and the liquid which has thus served its purpose is disposed of at R.

FIG. 3 is a flowsheet relating to an installation in which the initial liquid $A_0$ to be softened is not identical with the liquid $A_0'$ exposed to the treatment T, though it is of similar nature in that both $A_0$ and $A_0'$ contain at least sodium and calcium ions. A detailed description of FIG. 3 is unnecessary since its only difference with the flowsheet of FIG. 2 lies in the fact that the source of the treated liquid here designated $A_T'$, is not the source $A_0$ but a different source $A_0'$.

There will now be described by way of example two practical cases in which the invention was tested in the field.

Example I

The water used came from the Hamadenas area in Algeria (Oued Chelif Valley) and its composition was as follows:

| Ca | Mg | Na | Cl | SO$_4$ | CO$_3$ | (as bicarbonate.) |
|---|---|---|---|---|---|---|
| 152 | 60 | 273 | 444 | 416 | 109 | milligrams per liter. |

The total solids amounted to 1512 milligrams per liter and the total hardness valve, as based on (Ca+Mg) was 63 degrees (French rating). One degree in the French hardness rating being equal to 0.0002 gram equivalents, and a gram equivalent being equal to the gram-molecular weight of the metal divided by the valency of the metal.

The ion exchanger used for softening part of this water was the commercial product known as "Allassion C.S.". The initial water was passed through the ion exchanger at the rate of 2 liters per hour per liter ion-exchanger. The softened effluent water had a similarly rated hardness of value of only 10° (6° Ca+4° Mg).

Another portion of the same water was used for irrigation, and drainage water was collected which had the following composition, the increased concentrations being due to evaporation:

| Ca | Mg | Na | Cl | SO₄ | CO₃ | (as bicarbonate.) |
|----|----|----|----|-----|-----|-------------------|
| 575 | 481 | 3,265 | 5,623 | 2,206 | 184 | mg./l. |

The total solids content thus was 12,990 mg./l., and its hardness (Ca+Mg) rated as before was 345 degrees.

The drainage water was used to regenerate the spent ion exchanger. For this purpose the drainage water was passed through the ion exchanger at a rate of 2 liters per hour per liter exchanger.

A subsequent washing operation further required 2 liters of liquid per liter ion exchanger. The yield in softened water was 22 liters per liter ion exchanger.

*Example II*

The water used came from Oued Rhir in the Sahara desert and its initial composition was:

| Ca | Mg | Na | Cl | SO₄ | CO₃ | (as bicarbonate.) |
|----|----|----|----|-----|-----|-------------------|
| 489 | 156 | 911 | 1,458 | 1,580 | 85 | mg./l. |

The total solids content was 4778 mg./l., and the hardness value (Ca+Mg) was 188 degrees French rating.

The same procedure was used as in Example I. The softened liquid had a hardness rating (Ca+Mg) of 48 French degrees (32° Ca and 16° Mg).

The drainage water used for regeneration purposes according to the invention had the following composition:

| Ca | Mg | Na | Cl | SO₄ | CO₃ | (as bicarbonate.) |
|----|----|----|----|-----|-----|-------------------|
| 875 | 1,451 | 7,665 | 12,891 | 6,288 | 118 | mg./l. |

The total solids content was 29,971 mg./l., and its hardness rating (Ca+Mg) was 822 French degrees.

The regeneration required 6 liters of liquid per liter of the ion exchanger. The subsequent washing step took up 1.5 liters more per liter exchanger. The yield in softened water was 10.5 liters per liter ion exchanger.

It will be seen that in Example I, the Na/Ca ratio was 1.80 in the water to be softened, and 5.70 in the evaporation-concentrated water used to regenerate the spent ion exchanger. This represents a considerable increase in the sodium content over the calcium content.

The Na/Mg ratio was 4.55 before evaporation and 6.78 after, which also represents some increase.

In Example II the Na/Ca ratio increased from 1.86 to 8.87. In this case however the Na/Mg ratio decreased somewhat from 5.80 to 5.30. This shows that evaporation-concentration does not necessarily affect all of the constituents uniformly. Apparently on evaporation the calcium carbonate precipitates out first, followed by magnesium carbonate and later by calcium sulfate. As regards the carbonates, it should be noted that these form primarily by decomposition of the bicarbonate ions. Moreover, a salty or brackish water is actually a complex physico-chemical system in which the solubilities of the constituents may interact in various ways, with possible formation of poorly soluble mixed salts, acting to maintain in solution certain ions which otherwise would precipitate out, and vice versa.

The concentration conditions also depend on temperature, on the relative concentrations of the various ions, as well as on the rate of formation of the carbonate ions by decomposition of bicarbonate ions. In any case the conditions obtaining when the evaporation is proceeding in a lake a drainage pool or other large body of water are bound to differ substantially from the conditions that exist in a short-term laboratory operation. Sometimes, in an intial stage salts precipitate out which are later partly or completely redissolved in a subsequent stage. In all cases however evaporation results in a relative decrease of the concentration of carbonate or bicarbonate ions, sulfate, and calcium ions, and sometimes though not always a decrease in the concentration of magnesium ions. Hence, there is always a net increase in the sodium ion content.

It will be understood that the invention is not restricted to the examples given above and that it is susceptible of various modifications regarding the compositions of the liquids, the nature of the ion exchanger used, the rates of flow etc.

The invention may include recycling the liquids. Since relatively large volumes of regenerator liquid are required with respect to the volume of softened water, it is especially desirable to use ion exchange apparatus in which there is provision for a continuous flow through the softening stage and a continuous flow of regenerating liquid, through the ion exchanger.

While evaporation by sun heat has manifest economic advantages, the invention may in other cases employ artificial evaporation. In such cases care should be had to ensure that the heating schedule and other conditions used are such that the Na/Ca ratio (and more broadly the ratio of alkali ions to Ca and Mg ions) is greater after evaporation than before.

What I claim is:

The method of obtaining soft water from a source of hard water containing at least sodium chloride and the carbonates and sulfates of calcium and magnesium and which is used for irrigating land in arid regions, comprising passing a quantity of hard water from said source through an ion exchanger, irrigating the land with another quantity of hard water from said source so that the carbonates and sulfates of calcium and magnesium precipitate before said sodium chloride by reason of evaporation of the water used for irrigating purposes and leaves a drainage water having an increased relative sodium chloride concentration, and contacting said drainage water with said ion exchanger for regenerating the latter.

References Cited in the file of this patent

UNITED STATES PATENTS

| 1,722,603 | Turner | July 30, 1929 |
| 2,387,898 | Grebe et al. | Oct. 30, 1945 |
| 2,395,331 | Kaufman | Feb. 19, 1946 |

OTHER REFERENCES

Industry and Engineering Chemistry, vol. 47, No. 12, December 1955.